(12) United States Patent
Sun et al.

(10) Patent No.: US 9,749,729 B2
(45) Date of Patent: Aug. 29, 2017

(54) EARPHONE ASSEMBLY AND ASSISTANT GUIDING SYSTEM FOR TOURISTS

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Zong-Yuan Sun, New Taipei (TW); Da-Hua Xiao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 98 days.

(21) Appl. No.: 14/689,798

(22) Filed: Apr. 17, 2015

(65) Prior Publication Data

US 2016/0192053 A1    Jun. 30, 2016

(30) Foreign Application Priority Data

Dec. 31, 2014 (CN) .......................... 2014 1 0847114

(51) Int. Cl.
*H04R 1/10* (2006.01)
*G06K 7/10* (2006.01)
(Continued)

(52) U.S. Cl.
CPC ....... *H04R 1/1041* (2013.01); *G06K 7/10366* (2013.01); *H04R 1/1091* (2013.01);
(Continued)

(58) Field of Classification Search
CPC .......... G08B 13/14; G06F 17/30; G06F 21/10; H04L 9/32; H04R 1/1091; H04M 1/6066; A61H 3/061
(Continued)

(56) References Cited

U.S. PATENT DOCUMENTS 7,227,468 B1 *   6/2007  Florio ................. G07C 9/00111
                                                      235/375
2009/0160645 A1 * 6/2009  Duron .............. G06K 19/07749
                                                      340/572.1
(Continued)

FOREIGN PATENT DOCUMENTS

CN         102930317      *  2/2013  ............. G06F 21/10

*Primary Examiner* — Vivian Chin
*Assistant Examiner* — Ubachukwu Odunukwe
(74) *Attorney, Agent, or Firm* — Steven Reiss

(57) ABSTRACT

An assistant guiding system includes a plurality of radio frequency identification (RFID) tags, a server, and an earphone assembly. The plurality of RFID tags is located at a predetermined area, and each RFID tag pre-stores an identification number of the predetermined area. The server stores scenic spot introduction information of the predetermined area. The earphone assembly communicates with a portable electronic device of tourists, and the portable electronic device downloads the scenic spot introduction information from the server. The earphone assembly includes a reading module and a transmission module. The reading module reads the identification number from the RFID tag. The transmission module sends the identification number to the portable electronic device. The scenic spot introduction information corresponding to the identification number of the predetermined area is played or displayed on the portable electronic device.

15 Claims, 3 Drawing Sheets

(51) Int. Cl.
  *A61H 3/06*       (2006.01)
  *H04M 1/60*       (2006.01)
  *G06F 17/30*      (2006.01)

(52) U.S. Cl.
  CPC .............. *A61H 3/061* (2013.01); *G06F 17/30* (2013.01); *G06K 7/10425* (2013.01); *H04M 1/6066* (2013.01); *H04R 1/1033* (2013.01); *H04R 2201/103* (2013.01); *H04R 2460/07* (2013.01)

(58) Field of Classification Search
  USPC ........... 340/539.13, 572.8, 572.4, 572.1, 5.6, 340/5.74, 539.11, 4.11; 381/74, 81, 59, 381/85; 455/39, 41.2, 456.2; 707/999.001, 999.104, E17.044
  See application file for complete search history.

(56) References Cited

U.S. PATENT DOCUMENTS

2009/0267728 A1* 10/2009 Mayrand ............. G07C 9/00111
  340/5.6
2013/0329905 A1* 12/2013 Awiszus ............... H04R 1/1058
  381/74

\* cited by examiner

EARPHONE ASSEMBLY AND ASSISTANT GUIDING SYSTEM FOR TOURISTS

FIELD

The subject matter herein generally relates to assistant guiding devices for tourists, and more particularly to an earphone assembly and an assistant guiding system having a radio frequency identification (RFID) tag to assist the tourists with scenic spot introduction information (such as a historic site or a park) at a current location.

BACKGROUND

With the improvement of people's living standard, tourism has been developing vigorously. Group touring is a common method of vacationing. In such tours, the tour guide plans a certain journey at each stop, and thus a large group of people who usually don't know each other previously can travel from point to point.

BRIEF DESCRIPTION OF THE DRAWINGS

Implementations of the present technology will now be described, by way of example only, with reference to the attached figure.

DETAILED DESCRIPTION

Numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

The present disclosure is described in relation to an earphone assembly and an assistant guiding system for tourists.

Figure 1:
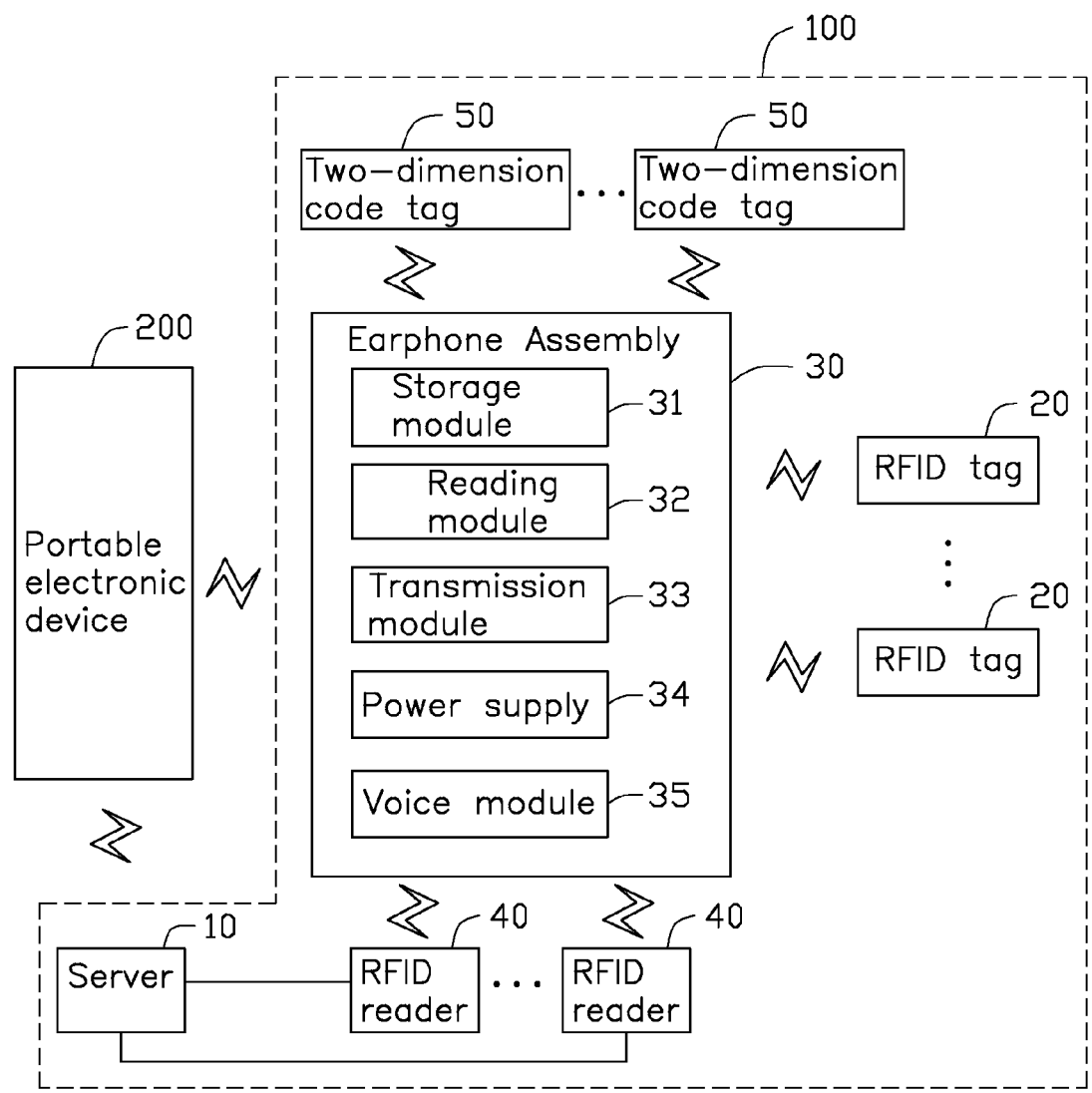
FIG. 1 is a block diagram of an assistant guiding system, according to a first exemplary embodiment.

FIG. 1 illustrates an embodiment of an assistant guiding system 100, according to a first exemplary embodiment. The assistant guiding system 100 includes a server 10, a plurality of radio frequency identification (RFID) tags 20, at least one earphone assembly 30, and a plurality of RFID readers 40.

The plurality of RFID tags 20 are dispersedly located at a predetermined area, such as a tourist spot, for example. Each RFID tag 210 pre-stores an identification number of the predetermined area to be identified by the earphone assembly 30. In at least one embodiment, each RFID tag 210 is sealed in a waterproof case (not shown), and then the watertight case can be embedded in a guiding brick in the predetermined area.

The server 10 stores scenic spot introduction information, such as sound information of a historic site or a park in the predetermined area, and the scenic spot introduction information can be downloaded by a portable electronic device 200 (for example, a mobile phone) of tourists. In addition, the scenic spot introduction information corresponds to the identification number of the predetermined area. Further, the server 10 is configured to record a total amount of the tourists at the predetermined area.

The earphone assembly 30 is configured to communicate with the portable electronic device 200. In at least one embodiment, the earphone assembly 30 includes a storage module 31, a reading module 32, and a transmission module 33. The storage module 31 stores identification information of the tourists. The reading module 32 reads the identification number of the predetermined area from the RFID tag 20. The transmission module 33 sends the identification number of the predetermined area to the portable electronic device 200. Thus, the scenic spot introduction information corresponding to the identification number of the predetermined area can be played or displayed on the portable electronic device 200.

The plurality of RFID readers 40 are dispersedly located at the predetermined area and communicate with the server 10. For example, the plurality of RFID readers 40 communicate with the server 10 via a fiber optic network or a serial port. Each RFID reader 40 has a radiation radius. The RFID reader 40 is configured to obtain the identification information of the tourists from the earphone assembly 30 which is in the radiation radius of the RFID reader 40 and output the identification information of the tourists to the server 10. That is, the RFID reader 40 communicates with the transmission module 33 of the earphone assembly 30 to receive the identification information of the tourists. Additionally, the server 10 stores a predetermined location of the plurality of RFID readers 40, and thus the server 10 determines a substantially position of the tourists according to the identification information of the tourists and the predetermined location of the plurality of RFID readers 40.

In at least one embodiment, all of the RFID tag 20, the RFID reader 40, and the reading module 32 can operate at about 2.4 GHz. In detail, the RFID tag 20 can be an active tag, both the RFID reader 40 and the reading module 32 can be active readers.

Further, the assistant guiding system 100 also includes a plurality of two-dimension code tags 50. The plurality of two-dimension code tags 50 are located at the predetermined area, and each two-dimension code tag 50 stores two-dimension code information indicating a location of the two-dimension code tag 50. The two-dimension code tag 50 can be scanned by the portable electronic device 200, thus, the portable electronic device 200 can obtain the two-dimension code information and send the two-dimension code information to the server 10. At this time, the server 10 can record a total amount of the tourists at the predetermined area, and then the server 10 sends a feedback signal indicating the total amount of the tourists at the predetermined area to the portable electronic device 200 to facilitate tour schedule of the tourists to save time. In at least one time, the portable electronic device 200 communicates with the server 10 via a cellular network or a WIFI network.

In other embodiments, the server 10 stores an electronic map which can be downloaded by the portable electronic device 200.

In use, when the tourists taking the earphone assembly 30 enters the predetermined area, such as a tourist spot, for example, the identification information of the tourists can be stored in the storage module 31, and then the earphone assembly 30 can communicate with the portable electronic device 200 of the tourists. In addition, the scenic spot introduction information can be downloaded from the server 10 via the portable electronic device 200. In at least one embodiment, the scenic spot introduction information can be stored in the portable electronic device 200 in a form of application (APP).

When the reading module 32 reads the identification number of the predetermined area from the RFID tag 20, the transmission module 33 sends the identification number of the predetermined area to the portable electronic device 200. Thus, the portable electronic device 200 can play or display the scenic spot introduction information corresponding to the identification number of the predetermined area. For example, the portable electronic device 200 broadcasts the scenic spot introduction information by means of speech.

In addition, when the earphone assembly 30 enters the radiation radius of the RFID reader 40, the RFID reader 40 can obtain the identification information of the tourists from the earphone assembly 30 via wireless communication and output the identification information of the tourists to the server 10. At this time, the server 10 can determine the substantially position of the tourists according to the identification information of the tourists and the predetermined location of the RFID reader 40. In other embodiments, the earphone assembly 30 can have an identification code which can be identified by the server 10. Thus, the tourists can be positioned and tracked, thereby preventing the tourists from getting lost.

In at least one embodiment, the earphone assembly 30 is a BLUETOOTH® earphone assembly, and consequently the transmission module 33 can be a BLUETOOTH® unit. Optionally, a power supply 34 and a voice module 35 are incorporated into the earphone assembly 30. The power supply 34 can be a rechargeable battery and is configured to provide power to the earphone assembly 30. The voice module 35 is configured to pick up voices from the tourists and transmit the voices to the transmission module 33.

Figure 2:
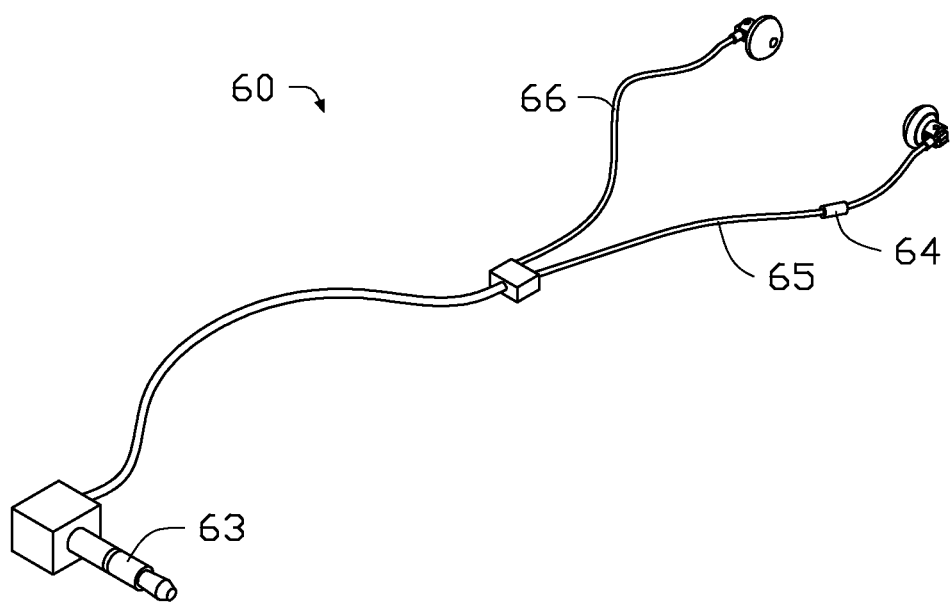
FIG. 2 is an isometric view of an earphone assembly, according to a second exemplary embodiment
Figure 3:
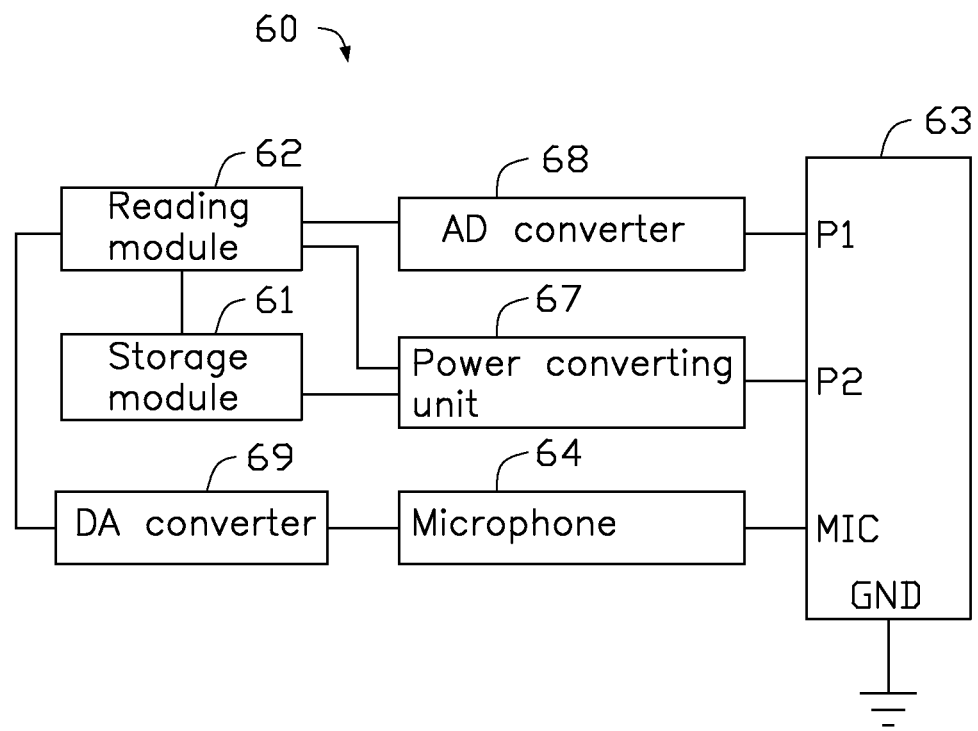
FIG. 3 is a block diagram of the earphone assembly of FIG. 2.

FIG. 2 and FIG. 3 illustrate an embodiment of an earphone assembly 60, according to a second exemplary embodiment. The earphone assembly 60 includes a storage module 61, a reading module 62, a transmission module 63, a power converting unit 67, an analog-to-digital (AD) converter 68, and a digital-to-analog (DA) converter 69. Functions of the storage module 61, the reading module 62, and the transmission module 63 are substantially equal to the storage module 31, the reading module 32, and the transmission module 33 of the first exemplary embodiment, respectively. In at least one embodiment, the transmission module 63 is a plug. That is, the transmission module 63 is inserted into an earphone assembly port of the portable electronic device 200, thereby establishing a communication between the transmission module 63 and the portable electronic device 200.

In at least one embodiment, the transmission module 63 includes a first channel pin P1, a second channel pin P2, a microphone pin MIC, and a ground pin GND. The first channel pin P1, the second channel pin P2, and the microphone pin MIC are electronically connected to a first cable 65, a second cable 66, and a microphone 64, respectively.

The reading module 62 is electronically connected to the first channel pin P1 via the AD converter 68, and is electronically connected to the microphone 64 via the DA converter 69. Thus, when the portable electronic device 200 outputs a first analog signal to the first channel pin P1, the AD converter 68 converts the first analog signal into a first digital signal, and then the AD converter 68 transmits the first digital signal to the reading module 62. When the reading module 62 outputs a second digital signal, the DA converter 69 converts the second digital signal into a second analog signal, and then the DA converter 69 transmits the second analog signal to the microphone 64, thus, the portable electronic device 200 receives the second analog signal from the microphone pin MIC.

In at least one embodiment, the portable electronic device 200 can download an audio signal generating software from the server 10. The audio signal generating software is configured to trigger audio signals. When the earphone assembly 60 is inserted into the portable electronic device 200, the audio signals can be received by the second channel pin P2. In addition, the power converting unit 67 is electronically connected to the second channel pin P2, the reading module 62, and the storage module 61. The power converting unit 67 is configured to convert the audio signals into current for powering the reading module 62 and the storage module 61.

In summary, the RFID tags 20 having the identification number are located at the predetermined area and can be identified by the earphone assembly 30, and the earphone assembly 30 sends the identification number of the predetermined area to the portable electronic device 200. Thus, the portable electronic device 200 can play or display the scenic spot introduction information corresponding to the identification number of the predetermined area. Therefore, the assistant guiding system 100 can broadcast the scenic spot introduction information to assist and guide the tourists, obviously, which is convenient and efficient.

The embodiments shown and described above are only examples. Many details are often found in the art such as the other features of the earphone assembly and the assistant guiding system for tourists. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An assistant guiding system, comprising:
   a plurality of radio frequency identification (RFID) tags located at a predetermined area, each RFID tag pre-storing an identification number of the predetermined area;
   a server storing scenic spot introduction information of the predetermined area; and
   an earphone assembly communicating with a portable electronic device of tourists, the portable electronic device downloading the scenic spot introduction information from the server, the earphone assembly comprising:
      a reading module reading the identification number of the predetermined area from the RFID tag; and
      a transmission module sending the identification number of the predetermined area to the portable electronic device;

wherein the scenic spot introduction information corresponding to the identification number of the predetermined area is played or displayed on the portable electronic device; and wherein the earphone assembly further comprises a analog-to-digital (AD) converter, the transmission module is a plug and comprises a first channel pin, the reading module is electronically connected to the first channel pin via the AD converter, the portable electronic device outputs a first analog signal to the first channel pin, the AD converter converts the first analog signal into a first digital signal, and the AD converter transmits the first digital signal to the reading module.

2. The assistant guiding system as claimed in claim 1, wherein the earphone assembly further comprises a storage module, the storage module stores identification information of the tourists.

3. The assistant guiding system as claimed in claim 2, further comprising a plurality of RFID readers located at the predetermined area, wherein each RFID reader has a radiation radius and is configured to obtain the identification information of the tourists from the earphone assembly which is in the radiation radius of the RFID reader.

4. The assistant guiding system as claimed in claim 3, wherein the RFID reader outputs the identification information of the tourists to the server, the server stores a predetermined location of the plurality of RFID readers and determines a substantially position of the tourists according to the identification information of the tourists and the predetermined location of the plurality of RFID readers.

5. The assistant guiding system as claimed in claim 1, wherein the earphone assembly is a BLUETOOTH® earphone assembly, the transmission module is a BLUETOOTH® unit.

6. The assistant guiding system as claimed in claim 5, wherein the earphone assembly further comprises a power supply and a voice module, the power supply is configured to provide power to the earphone assembly, and the voice module is configured to pick up voices from the tourists and transmit the voices to the transmission module.

7. The assistant guiding system as claimed in claim 1, wherein the earphone assembly further comprises a digital-to-analog (DA) converter and a microphone, the transmission module further comprises a microphone pin, the reading module is electronically connected to the microphone via the DA converter, the reading module outputs a second digital signal, the DA converter converts the second digital signal into a second analog signal, and the DA converter transmits the second analog signal to the microphone, the portable electronic device receives the second analog signal from the microphone pin.

8. The assistant guiding system as claimed in claim 1, wherein the earphone assembly further comprises a storage module and a power converting unit, the transmission module further comprises a second channel pin, the power converting unit is electronically connected to the second channel pin, the reading module, and the storage module, the power converting unit is configured to convert audio signals output from the second channel pin into current for powering the reading module and the storage module.

9. The assistant guiding system as claimed in claim 1, further comprising a plurality of two-dimension code tags located at the predetermined area, wherein each two-dimension code tag stores two-dimension code information indicating a location of the two-dimension code tag, the portable electronic device obtains the two-dimension code information and sends the two-dimension code information to the server, and the server can records a total amount of the tourists at the predetermined area and sends a feedback signal indicating the total amount of the tourists at the predetermined area to the portable electronic device.

10. An earphone assembly in communication with a plurality of radio frequency identification (RFID) tags and a portable electronic device of tourists, the plurality of RFID tags located at a predetermined area, each RFID tag pre-storing an identification number of the predetermined area, the portable electronic device storing scenic spot introduction information of the predetermined area, and the scenic spot introduction information of the predetermined area associated with the identification number, the earphone assembly comprising:

a reading module reading the identification number of the predetermined area from the plurality of RFID tags;

a transmission module sending the identification number of the predetermined area to the portable electronic device to control the portable electronic device to play or display the scenic spot introduction information of the predetermined area corresponding to the identification number; and a analog-to-digital (AD) converter, wherein the transmission module is a plug and comprises a first channel pin, the reading module is electronically connected to the first channel pin via the AD converter, the portable electronic device outputs a first analog signal to the first channel pin, the AD converter converts the first analog signal into a first digital signal, and the AD converter transmits the first digital signal to the reading module.

11. The earphone assembly as claimed in claim 10, further comprising a storage module storing identification information of the tourists, wherein the earphone assembly communicates with a plurality of RFID readers located at the predetermined area, each RFID reader has a radiation radius and is configured to obtain the identification information of the tourists from the earphone assembly which is in the radiation radius of the RFID reader.

12. The earphone assembly as claimed in claim 10, wherein the earphone assembly is a BLUETOOTH® earphone assembly, the transmission module is a BLUETOOTH® unit.

13. The earphone assembly as claimed in claim 12, further comprising a power supply and a voice module, wherein the power supply is configured to provide power to the earphone assembly, and the voice module is configured to pick up voices from the tourists and transmit the voices to the transmission module.

14. The earphone assembly as claimed in claim 10, further comprising a digital-to-analog (DA) converter and a microphone, wherein the transmission module further comprises a microphone pin, the reading module is electronically connected to the microphone via the DA converter, the reading module outputs a second digital signal, the DA converter converts the second digital signal into a second analog signal, and the DA converter transmits the second analog signal to the microphone, the portable electronic device receives the second analog signal from the microphone pin.

15. The earphone assembly as claimed in claim 10, further comprising a storage module and a power converting unit, wherein the transmission module further comprises a second channel pin, the power converting unit is electronically connected to the second channel pin, the reading module, and the storage module, the power converting unit is configured to convert audio signals output from the second channel pin into current for powering the reading module and the storage module.

\* \* \* \* \*